United States Patent [19]

Bennett et al.

[11] Patent Number: 4,488,325
[45] Date of Patent: Dec. 18, 1984

[54] TRUCK LOCKING DEVICE

[75] Inventors: David E. Bennett, Waukesha; Joseph R. Driear, Thiensville, both of Wis.

[73] Assignee: Kelley Company Inc., Milwaukee, Wis.

[21] Appl. No.: 367,296

[22] Filed: Apr. 12, 1982

[51] Int. Cl.³ .................. E01D 1/00; B65G 69/00; B60D 7/00

[52] U.S. Cl. .................. 14/71.3; 14/71.1; 414/401

[58] Field of Search .............. 14/71.3, 71.1, 71.7, 14/69.5; 414/401, 396, 584

[56] References Cited

U.S. PATENT DOCUMENTS

| | | | |
|---|---|---|---|
| 3,877,102 | 4/1975 | Artzberger | 14/71.3 |
| 3,995,342 | 12/1976 | Wiener | 14/71.3 |
| 3,997,932 | 12/1976 | Artzberger | 14/71.3 |
| 4,127,856 | 11/1978 | Bickel | 14/71.1 X |
| 4,373,847 | 2/1983 | Hipp et al. | 414/401 |

*Primary Examiner*—James A. Leppink
*Assistant Examiner*—Beverly E. Hjorth
*Attorney, Agent, or Firm*—Andrus, Sceales, Starke & Sawall

[57] ABSTRACT

A device for locking a vehicle to a loading dock during a loading operation. The device includes a frame mounted on the front surface of the dock beneath a pit which houses an adjustable dockboard. A slide assembly is mounted for vertical movement on the frame, and the slide assembly includes a locking member adapted to engage an abutment on the vehicle, as the slide assembly is elevated. To raise and lower the slide assembly, a motor is mounted on the slide assembly and drives a gear that engages a rack carried by the frame. The rack is spring biased to an upper position, and on operation of the motor in one direction, the slide assembly is raised to bring the locking member into engagement with the abutment on the vehicle. Continued operation of the motor will then move the rack downwardly relative to the gear and slide assembly, and downward movement of the rack will activate a switch to cut off power to the motor. After the loading operation is completed the motor is driven in the opposite direction to lower the locking member to its storage position. The movement of the slide assembly and locking member can be tied into the operation of the lip of the dockboard in which the motor will automatically be operated to move the locking member upwardly toward the locking position when the lip is raised from its pendant position, and the motor will be operated in the reverse direction when the loading operation is completed and the lip is returned to its pendant position.

18 Claims, 11 Drawing Figures

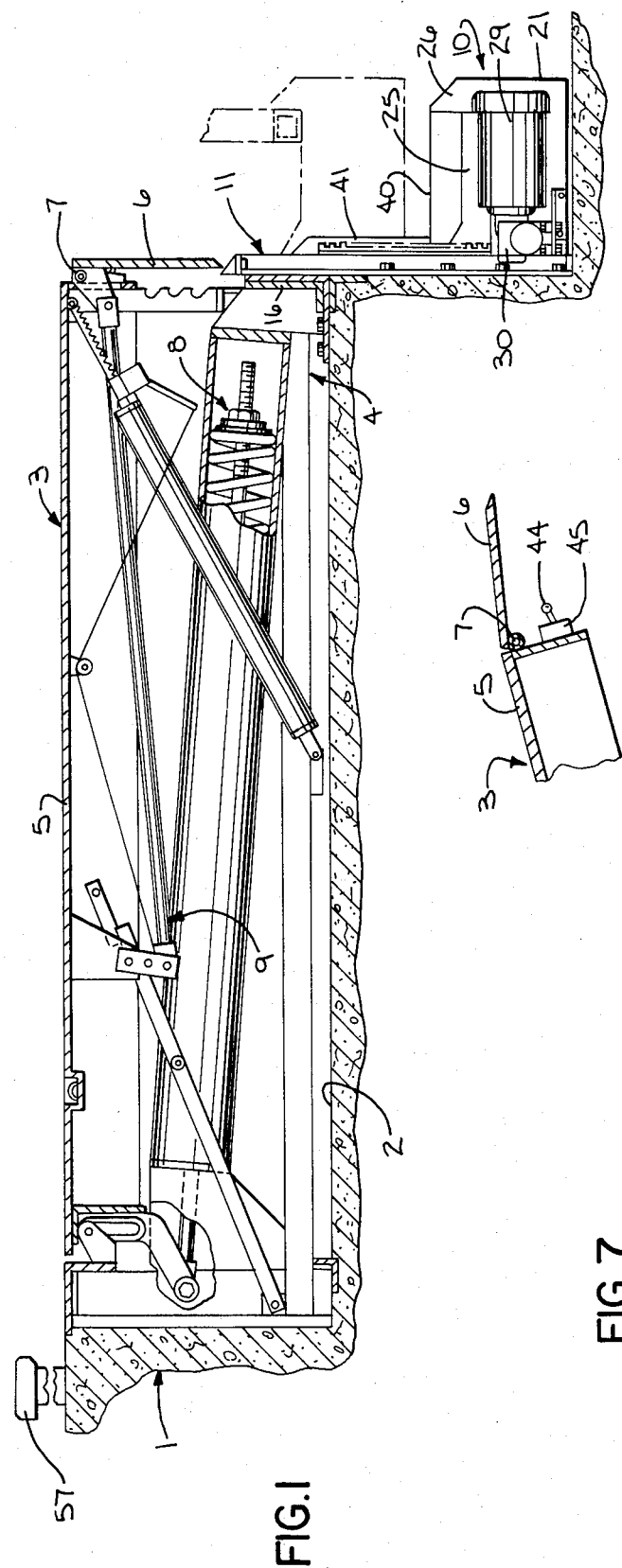
FIG.1
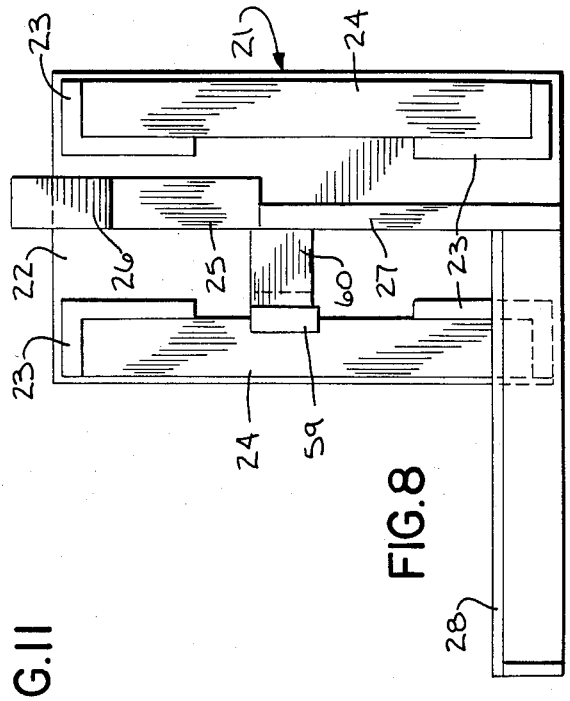
FIG.8
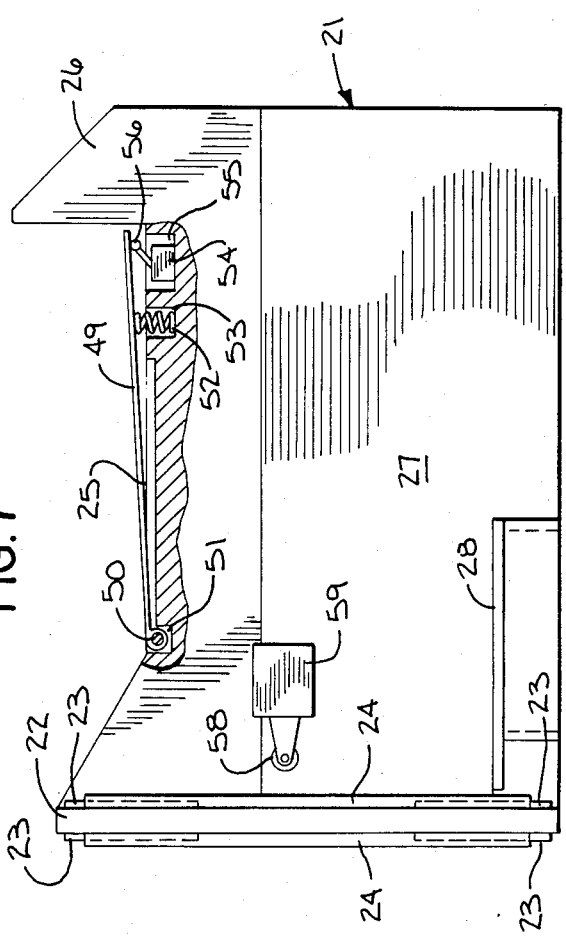
FIG.11
FIG.7

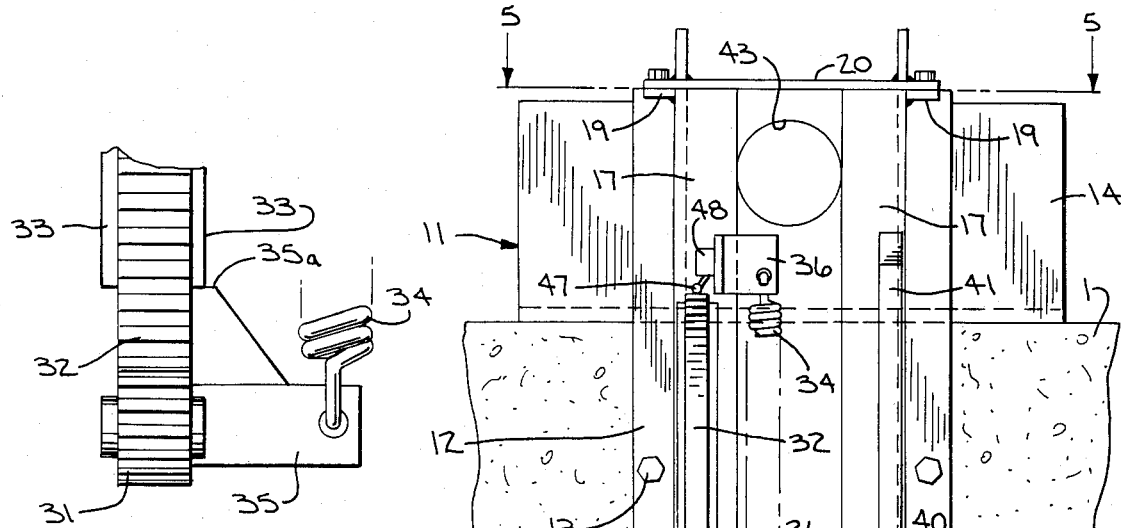
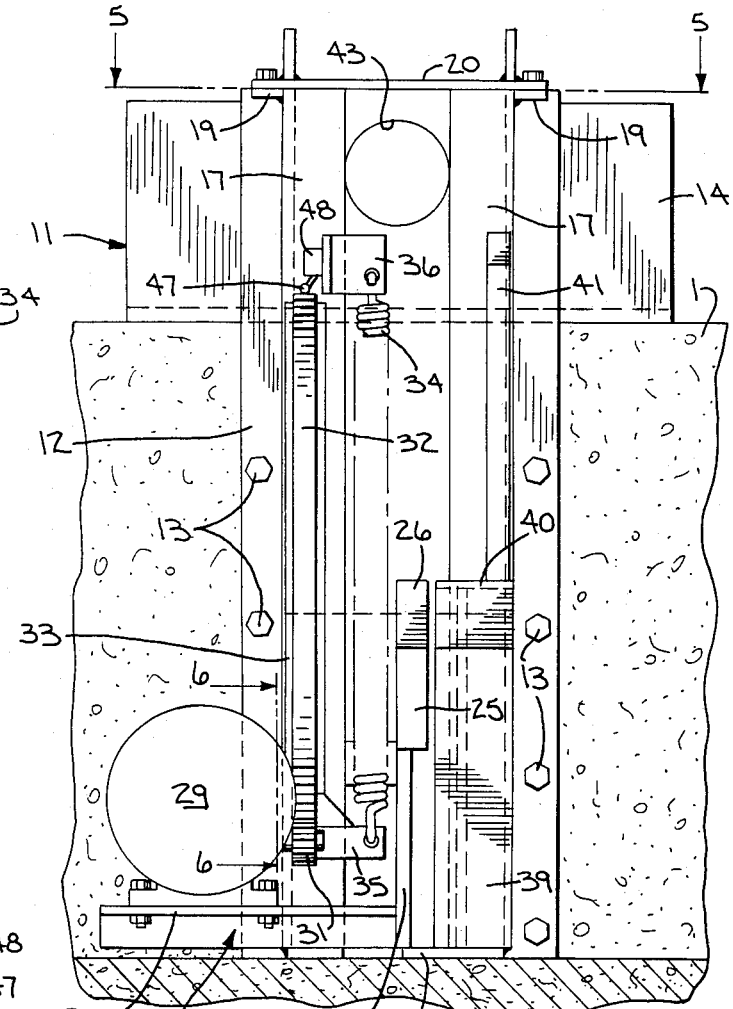
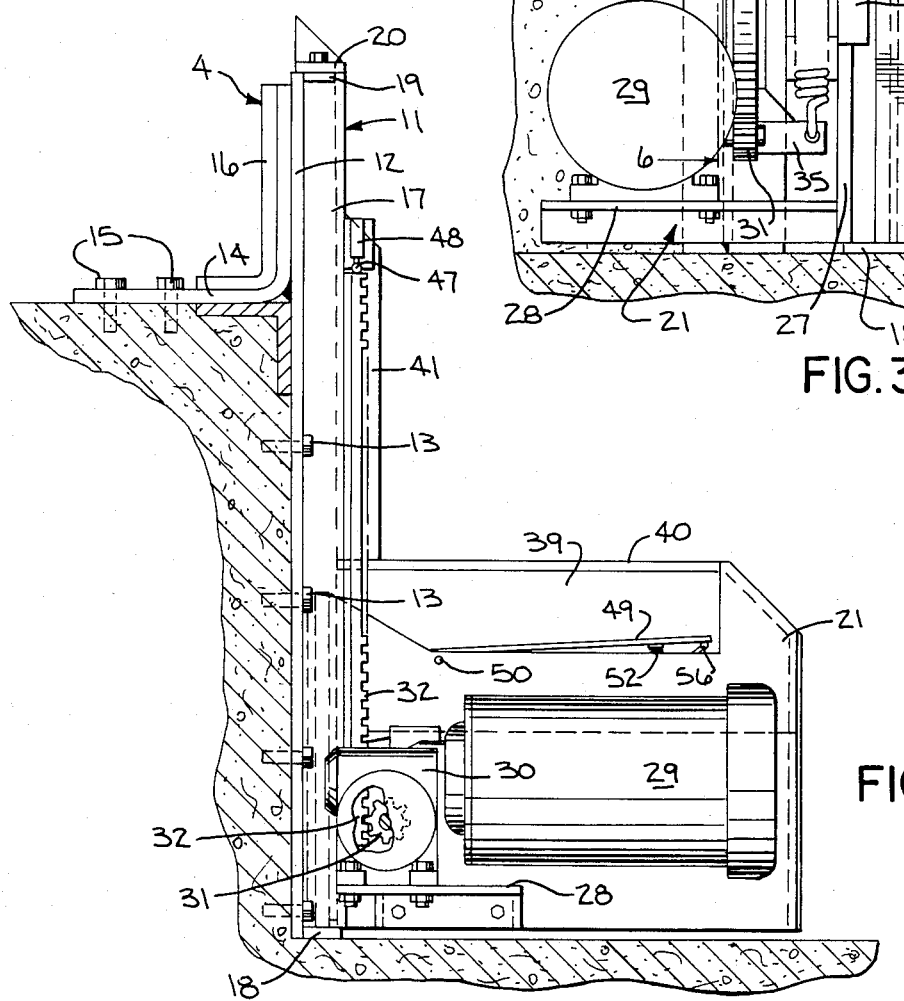
FIG.10
FIG.3
FIG.2

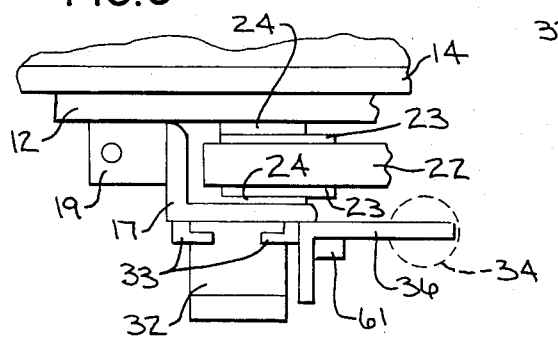
FIG. 4
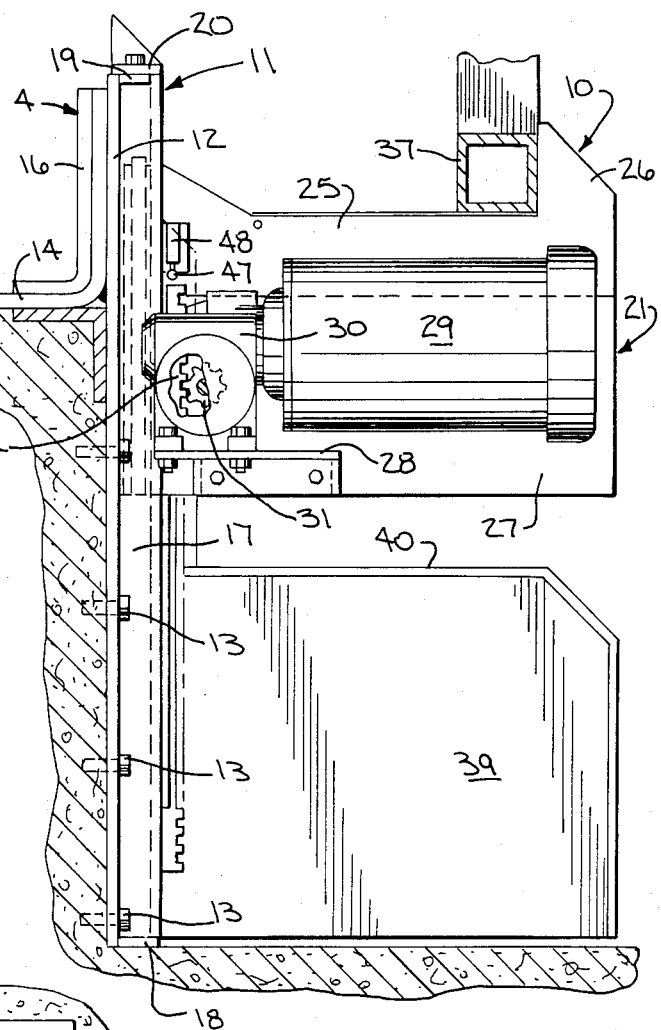
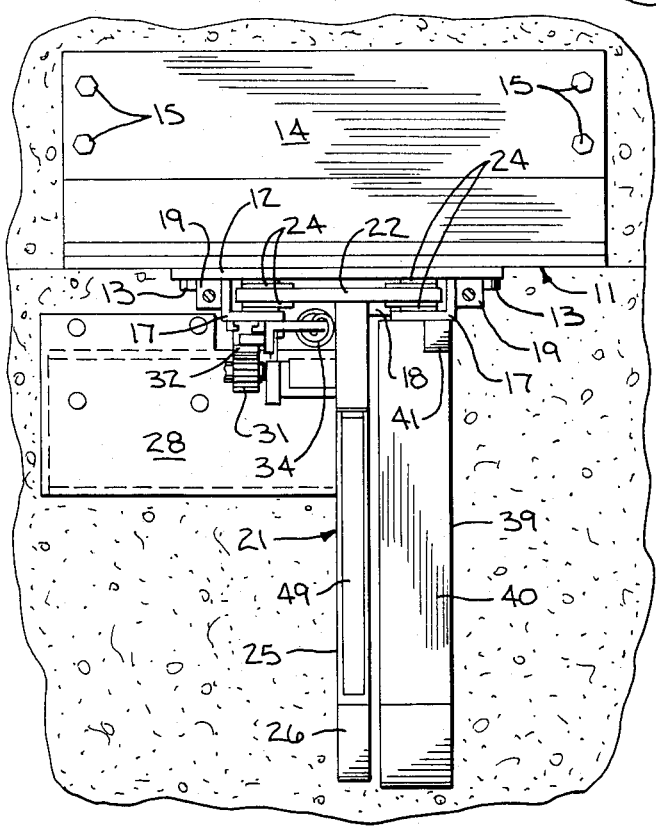
FIG. 5
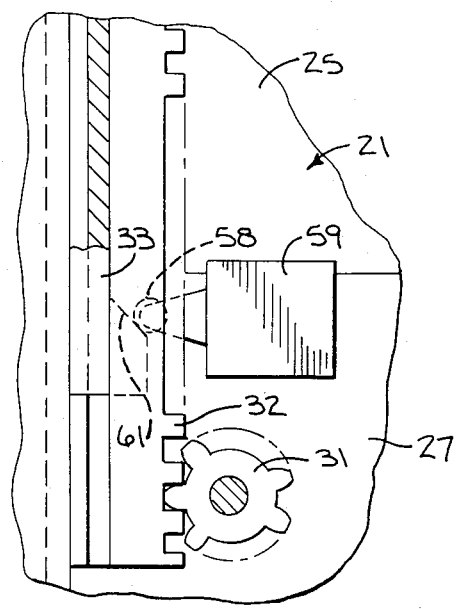
FIG. 6

TRUCK LOCKING DEVICE

BACKGROUND OF THE INVENTION

Locking devices have been used in the past to lock a truck or other vehicle to a dock during a loading operation to prevent the truck from accidentally moving away from the dock. Movement of the truck away from the dock, while the loading operation is proceeding, can cause injury to workmen or damage to material handling equipment, or to the cargo being loaded.

In general, locking devices, as used in the past have been amounted on the dock and have been operated either manually or automatically to pivot a locking member or hook into engagement with the underride prevention bumper, commonly referred to as an "ICC" bumper, which is located at the rear of the truck. With a manual type of locking device, the operator, after the truck has backed into position in front of the dock, manually pivots the hook, or locking member, to a locking position in engagement with the truck bumper and locks the hook in this position. After loading is completed, the hook is manually released and returned to its storage position. As the hook is relatively heavy and is located on the front surface of the dock in a rather inaccessible location, it is a difficult task to manually engage and disengage the locking hook. As a consequence, there is no assurance that the operator will utilize the locking device.

Other types of truck locking mechanisms have been proposed which can be actuated by controls on the dock. Locking devices of this type, which can either be hydraulically or electro-mechanically operated, require push-button activation by the operator to move the locking device to the locking position and to disengage the locking device after the loading operation has been completed.

SUMMARY OF THE INVENTION

The invention is directed to an improved locking device for locking a truck, or other vehicle, to a loading dock during the loading operation, and which is automatically activated and released without operator attention.

The locking device of the invention has particular application for use with an adjustable pit-mounted dockboard of the type disclosed in U.S. Pat. No. 3,997,932. With a dockboard of this type, a ramp is hinged at its rear edge to a pit-mounted frame or supporting structure and is movable between a generally horizontal cross traffic position and an upwardly inclined position. Hinged to the forward edge of the ramp is a lip which can be pivoted from a downwardly extending pendant position to an outwardly extended position where it forms an extension to the ramp.

The locking device of the invention includes a frame which is secured to the front surface of the dock and to the pit floor beneath the dockboard, and a slide assembly is mounted for vertical movement relative to the frame. The slide assembly includes a locking member which is adapted to be moved linearly in a vertical direction to engage the underride prevention bumper on the truck.

To raise and lower the slide assembly, a motor is mounted on the slide assembly and drives a gear or pinion that engages a rack carried by the frame, and the rack is spring-biased to an upper position.

After the truck is positioned in front of the dock, the dockboard is operated to pivot the ramp from the horizontal cross-traffic position to the upwardly inclined position, and subsequently, the lip is pivoted by a lip lifting mechanism from the pendant to the extended position. Movement of the lip from the pendant to the extended position acts to drive the motor on the slide assembly in a first direction to drive the pinion and elevate the slide assembly and locking member relative to the frame. When the locking member engages the truck bumper, continued operation of the motor will cause the rack to move downwardly against the force of the biasing spring and open a switch which cuts off power to the motor. The locking member will be held snugly against the bumper, by virtue of the biasing force of the spring, so that the truck will be held against outward movement away from the dock, while the loading operation is being carried out.

After the loading operation has been completed, the operator will again raise the ramp toward its inclined position and the lip will pivot back to the pendant position, thereby actuating controls to drive the motor in the opposite direction and lower the slide assembly and locking member relative to the frame. When the slide assembly reaches its lower storage position it actuates a limit switch which terminates operation of the motor.

The locking mechanism of the invention automatically moves the locking member into engagement with the truck bumper and will automatically release the locking mechanism after the loading operation is completed, thereby eliminating all possibility of operator error or neglect in activating the locking device.

As an added feature, the locking member includes a sensor which is operably connected to a signalling device, such as a light or audio alarm, on the loading dock. When the locking member is in engagement with the truck bumper, the sensor will be energized to activate the signal to indicate to the operator of material handling equipment and the truck driver that a loading operation is in progress and the locking mechanism is properly engaged with the truck.

The spring biasing mechanism associated with the rack automatically acts to snub or urge the locking member into engagement with the truck bar, and similarly will maintain engagement of the locking member with the truck bumper in situations where the truck bed may rise or fall due to cargo being applied to or removed from the truck bed.

The locking device is attached through anchor bolts to both the front surface of the dock, as well as to the upper surface of the pit and is not physically attached to the dockboard. Thus, any force applied to the locking device by outward movement of the truck away from the dock will not be transmitted to the dockboard itself. Furthermore, any such force will act in shear on the anchor bolts attached to the upper surface of the pit to resist disengagement of the locking device from the dock.

The slide and locking member are stored in a lower position, slightly above the ground and a guard is mounted on the frame, alongside the lowermost position of the locking member or hook. The guard prevents accidental engagement of a low level vehicle bumper with the hook, should a small-sized truck or automobile back into position adjacent the dock.

Other objects and advantages will appear in the course of the following description.

DESCRIPTION OF THE DRAWINGS

The drawings illustrate the best mode presently contemplated of carrying out the invention.

In the drawings:

FIG. 1 is a vertical section of a loading dock incorporating a dockboard and the vehicle locking device of the invention;

FIG. 2 is a side elevation of the vehicle locking device with the locking member in the lower storage position;

FIG. 3 is a front elevation of the device;

FIG. 4 is a side elevation of the locking device showing the locking member in engagement with an underride prevention bumper of a truck;

FIG. 5 is a top plan view of the locking device;

FIG. 6 is an enlarged fragmentary vertical section showing the rack and pinion drive;

FIG. 7 is an enlarged side elevation of the slide assembly with parts broken away;

FIG. 8 is an end view of the slide assembly;

FIG. 9 is an enlarged fragmentary top plan of the slide assembly and drive mechanism;

FIG. 10 is an enlarged fragmentary front elevation showing the rack and pinion drive; and FIG. 11 is an enlarged fragmentary side elevation of the dockboard showing the lip in the extended position.

DESCRIPTION OF THE ILLUSTRATED EMBODIMENT

FIG. 1 illustrates a loading dock 1 having a pit or depression 2 formed in its upper surface and an adjustable dockboard 3 of the type disclosed in U.S. Pat. No. 3,997,932.

The dockboard 3, in general, includes a supporting structure or frame 4, and a ramp 5 is hinged at its rear edge to supporting frame 4 and can be pivoted from a generally horizontal cross-traffic position, where it is flush with the upper surface of the dock, to an upwardly inclined position. Lip 6 is hinged to the forward edge of ramp 5 by hinge pins 7 and is pivotable between a downwardly hanging pendant position and an outwardly extending position where it forms an extension to the ramp.

Ramp 5 is biased to an upwardly inclined position by a spring assembly, indicated generally by 8, and lip 6 is pivoted to the extended position by a lip lifting mechanism indicated by 9, as described in the aforementioned patent application. The particular construction of the dockboard 3, in itself, forms no part of the present invention.

In accordance with the invention, a vehicle locking device 10 is mounted on the forward surface of the dock 1 beneath the dockboard 3. The locking device 10 comprises a stationary frame 11 including a vertical plate 12 which is mounted to the forward surface of the dock 1 through a series of anchor bolts 13. Secured to the upper end of the plate 12 is an angle bracket 14, and the horizontal flange of the angle bracket is secured to the upper surface of pit 2 through anchor bolts 15. With this construction, the locking device 10 is secured solely to the loading dock and the forward base angle 16 of the frame 4 of the dockboard merely rests against the angle bracket 14, as illustrated in FIG. 1.

Extending forwardly from the vertical plate 12 is a pair of spaced angles 17, as shown in FIG. 5, and the lower ends of the angles are connected together by a horizontal bottom plate 18. Lugs 19 extend outwardly from the side edges of the angles 17 and a top plate 20 is bolted to the lugs 19.

The locking device 10 also includes a slide assembly 21 that is mounted for vertical movement with respect to the frame 11. As best shown in FIG. 7, the slide assembly includes a vertical back plate 22 which is mounted for sliding movement between the plate 12 and the aligned flanges of the angles 17. To aid in sliding movement, a series of L-shaped bearing retainers 23 are secured to oppsite faces of plate 22, and bearing strips 24, made of nylon or other material having a low coefficient of sliding friction, are retained by the retaining strips 23. As slide assembly 21 moves vertically relative to the frame 11, the bearing strips 24 will ride against the outer surface of the plate 12, as well as against the inner surfaces of the flanges of the angles 17, to thereby facilitate sliding movement of the slide assembly.

As best shown in FIG. 7, the slide assembly includes a locking member 25 which extends forwardly from back plate 22 and the outer end of the locking member extends upwardly and defines a hook 26. To provide added reinforcement for the locking member a plate 27 extends downwardly from the lower edge of the locking member. The rear vertical edge of plate 27 is welded to plate 22, and mounting plate 28 extends laterally from the lower edge of plate 27.

The drive mechanism for moving slide assembly 21 relative to the frame 11 is mounted on plate 28 and includes a motor 29 which operates through a gear box 30 to drive a pinion or drive gear 31. As shown in FIG. 6, the gear 31 engages the teeth on a vertically extending rack 32 that is mounted on frame 11.

As best shown in FIG. 9, the rack 32 is mounted between angle-shaped spaced guide members 33, and rack 32 is biased to an upper position by spring 34. As illustrated in FIG. 3, one end of spring 34 is attached to a bracket 35 which extends laterally from the lower end of rack 32, while the upper end of the spring is connected to a bracket 36 that is mounted on one of the angles 17 on frame 11. The force of the spring 34 urges the rack upwardly, and engagement of the edge 35a of bracket 35 with the lower end of one of the guides 33 limits the upward movement of the rack, as shown in FIG. 10.

With this construction, operation of the motor 29 in one direction will rotate the pinion 31 to move the slide assembly upwardly relative to rack 32 and frame 11, thereby bringing the locking member 25 into engagement with the underride prevention bumper 37 of the truck which is located in front of the dock. When the locking member 25 engages the bumper 37, continued operation of motor 29 cannot move the locking member 25 further upward and instead will drive the rack 32 downwardly against the force of spring 34 and this downward movement of rack 32, as will be described in greater detail hereinafter, will operate to shut off power to motor 29.

As illustrated in FIG. 1, a guard 39 extends forwardly from the frame 11 and the upper surface 40 of the guard is substantially flush with the upper tip of hook 26. Guard 39 prevents a low level vehicle bumper from accidentally being hung up on the hook 26 when the slide assembly 21 is in its lowermost position, as could occur if a small-sized pick-up truck or passenger vehicle backed toward the dock. In addition, a protective rib 41 extends upwardly from guard 39 and affords protection to rack 32 and spring 34 in the event a vehicle backs diagonally toward the loading dock and does not properly engage the dock bumpers that are mounted on the front surface of the dock.

As the locking device 10 is located in general alignment with the spring assembly 8 of the dockboard, an access hole 43 is formed with the plate 12 to permit insertion of a tool to adjust the tension of the spring assembly.

OPERATION

To begin the loading operation, the slide assembly 21 is in its lowermost storage position and the ramp 5 of dockboard 3 is in its cross traffic position with lip 6 in a pendant position. As the truck backs toward the dock for the loading operation, the rear end of the truck bed will engage the bumpers, which are mounted on the front surface of the dock on either side of dockboard 3, and engagement of the truck bed with the bumpers will space the truck bed from the dockboard 3 and locking device 10.

The operator will then actuate the necessary controls to pivot the ramp to its upwardly inclined position and either as a consequence of the ramp moving upwardly, or as a consequence of the ramp being "walked-down" by the operator from the inclined position, the lip 6 will be pivoted from the pendant position to its extended position releasing arm 44 of limit switch 45 which is mounted on the ramp 5 and is normally engaged by the pendant lip. Releasing arm 44 will actuate switch 45 to close a circuit to supply power to motor 29, and the operation of motor 29 will move the slide assembly 21 upwardly and bring the locking member 25 into engagement with the bumper 37 on the truck. When the locking member 25 engages bumper 37, continued operation of the motor 29 will cause rack 32 to move downwardly within guides 33 against the force of spring 34. The downward movement of rack 32 will move the upper end of the rack out of engagement with the arm 47 of limit switch 48, which is mounted on bracket 36, thereby opening the circuit to motor 29 to discontinue the supply of power to motor 29. At this time the spring is slightly extended and the force of the spring will urge rack 32 upwardly, and as rack 32 is engaged with gear 31 the slide assembly will also be urged upwardly to snub locking member 25 into tight engagement with the truck bumper 37.

The invention also has a provision for providing a signal either to the operator on the loading dock or to the truck driver showing that locking member 25 is in its locked position with respect to the truck bumper 37. In this regard, a sensor bar or strip 49 is disposed on the upper surface of locking member 25 and the inner end of bar 49 is connected to shaft 50 which is located within a recess 51 in the locking member, as shown in FIG. 7. The ends of shaft 50 are mounted for rotation within suitable openings bordering recess 51, and bar 49 is biased to a slightly inclined position by a spring 52 which is mounted within well 53 in locking member 25. In addition, a limit switch 54 is also mounted in a recess or well 55 in the upper surface of locking member 25 and the arm 56 of limit switch 55 projects outwardly toward the bar.

When locking member 25 is moved upwardly into engagement with bumper 37 on the truck, bar 49 is depressed against the force of spring 52 and trips arm 56 of limit switch 55 to thereby close an electrical circuit to a signalling device, such as one or more lights 57, mounted on or adjacent, the loading dock. The light 57 will indicate to the operator on the dock and/or to the truck driver, that a loading operation is in progress and that locking member 25 is in engagement with the bumper 37 on the truck.

After the loading operatiaon has been completed, the operator will again raise the ramp and movement of the ramp toward its upwardly inclined position will cause lip 6 to fall to its pendant position in the manner described in U.S. Pat. No. 3,997,932. Movement of lip 6 toward its pendant position will actuate the switch 45 to thereby operate motor 29 in the reverse direction and move the slide assembly 21 and locking member 25 downwardly with respect to the frame 11 to release the locking member from engagement with bumper 37. Downward movement of slide assembly 21 is terminated by engagement of arm 58 of limit switch 59, which is attached to bracket 60 on slide plate 22, with inclined cam surface 61 on angle 17. When the limit switch 58 is tripped, power to the motor 29 will be discontinued to thereby store the slide assembly 21 in its lower position.

The locking device of the invention, when used in combination with a dockboard, is automatically locked and released as a consequence of pivotal movement of lip 6. This eliminates the possibility of operator error or negligence in operating the locking device.

In addition, sensor 49, which is associated with locking member 25, generates a signal, which indicates to the operator, and/or to the truck driver, that the locking member is properly engaged with the bumper on the vehicle.

Through operation of spring 34, locking member 25 will be urged into tight engagement with truck bumper 37, and the biasing action of the spring also enables the locking member to follow vertical movement of the truck bed, as can occur when cargo is loaded onto the truck bed, or when cargo is unloaded.

The locking device is mounted directly on the loading dock, independently of the dockboard, and any forces generated by the truck in attempting to move away from the dock with the locking device in its locking position, will act in shear on the anchor bolts 15. Similarly, any vertical force applied to the frame will act in shear on the anchor bolts 13 that connect the plate 12 to the forward face of the dock. Thus, the attachment mechanism provides improved strength against both fore and aft forces, as well as vertical forces.

Various modes of carrying out the invention are contemplated as being within the scope of the following claims particularly pointing out and distinctly claiming the subject matter which is regarded as the invention.

We claim:

1. A locking device for locking a movable structure to a fixed structure, comprising a frame mounted on the fixed structure, a slide mounted for vertical sliding movement with respect to the frame, a portion of the slide defining a locking element, a gear member, a rack member, a first of said members being connected to said frame and a second of said members being connected to said slide, and reversivble drive means carried by said slide and operably connected to said second member for moving said slide upwardly in a linear direction to bring said locking element into engagement with an abutment on said movable structure and for moving said slide downwardly relative to the frame to disengage the locking element from said abutment.

2. The device of claim 1, wherein the rack member is connected to the frame and the gear member is connected to the slide.

3. The device of claim 2, wherein said drive means is mounted on the slide and is operably connected to said gear member.

4. The device of claim 1, wherein the slide is mounted for movement between a lower storage position and an upper locking position, and fixed guard means disposed adjacent said locking element when the slide is in said storage position to prevent accidental engagement of said locking element with an abutment.

5. A locking device for locking a vehicle to a loading dock, comprising a frame mounted on the dock, a slide mounted for vertical sliding movement on said frame between a lower storage position and an upper locking position, said slide including a locking element, reversible drive means mounted on said slide and including a drive gear, a rack disposed on the frame and engaged with the gear whereby rotation of said gear will move the slide relative to said rack and said frame, and biasing means interconnecting the rack and the frame to bias the rack to an upper position, operation of said drive means in one direction causing the slide to move upwardly relative to the frame to bring the locking element into engagement with an abutment on a vehicle to thereby prevent outward movement of said vehicle relative to the dock, continued operation of said drive means after engagement of said locking element with said abutment causing said gear to drive the rack downwardly against said biasing means, means responsive to downward movement of said rack for discontinuing operation of said drive means, subsequent operation of said drive means in the opposite direction causing said slide to move downwardly relative to the frame to disengage said locking element from said abutment.

6. The device of claim 5, and including first guide means for guiding said slide in vertical movement with respect to said frame, and second guide means for guiding said rack in vertical movement with respect to said frame.

7. The device of claim 5, wherein said biasing means comprises a spring interconnecting said rack and said frame.

8. The device of claim 5, and including means operably connected to said drive means and responsive to the slide moving downwardly to said storage position for discontinuing operation of said drive means.

9. The device of claim 5, wherein said locking element comprises a hook, said device also including a guard fixed to said frame and disposed in side-by-side relation with said slide when the slide is in the lower storage position, said guard including a surface disposed above the level of said hook to prevent accidental engagement of said hook with an abutment when the slide is in said storage position.

10. In combination, a dockboard mounted on a loading dock and including a supporting structure, a ramp hinged at its rear edge to the supporting structure and movable between a generally horizontal cross traffic position and an upwardly inclined position, a lip hinged to the forward edge of the ramp and movable between a downwardly hanging pendant position and an extended position, a vehicle locking device for locking a vehicle against outward movement relative to the dock and including a frame mounted on the forward surface of the dock beneath said dockboard, a slide mounted for vertical sliding movement relative to the frame and including a locking element, reversible drive means operably connected to said slide for moving the slide relative to the frame, means responsive to movement of the lip from the pendant position toward the extended position for operating said drive means in one direction to move the slide upwardly and bring the locking element into engagement with an abutment on said vehicle to thereby prevent outward movement of the vehicle from the loading dock.

11. The combination of claim 10, and including means responsive to downward movement of the lip from the extended position toward the pendant position for operating said drive means in the opposite direction to move said slide downwardly relative to the frame to disengage the locking element from said abutment.

12. In combination, a dockboard mounted on a loading dock and including a supporting structure, a ramp hinged at its rear edge to the supporting structure and movable between a generally horizontal cross traffic position and an upwardly inclined position, a lip hinged to the forward edge of the ramp and movable between a downwardly hanging pendnt position and an extended position, a vehicle locking device for locking a vehicle against outward movement relative to the dock and including a frame mounted on the forward surface of the dock beneath said dockboard, a slide mounted for vertical sliding movement relative to the frame and including a locking element, drive means operably connected to said slide for moving said slide relative to said frame to bring the locking element into engagement with an abutment on said vehicle to thereby prevent outward movement of the vehicle from the loading dock, said locking element including an inner section extending outwardly from said slide and an outer section extending upwardly at an angle from the outer end of said inner section, sensing means associated with said inner section and projecting upwardly above said inner section and disposed to engage said abutment, and signal means operably connected to said sensing means, actuation of said sensing means by engagement of said locking element with said abutment operating said signal means to generate a signal indicating the engagement of the locking element with the vehicle.

13. The combination of claim 12, wherein said sensor is pivotally connected to the upper surface of said locking element.

14. The combination of claim 12, wherein said signal means comprises a light.

15. In combination, a dockboard mounted on a loading dock and including a supporting structure, a ramp hinged at its rear edge to the supporting structure and movable between a generally horizontal cross traffic position and an upwardly inclined position, a lip hinged to the forward edge of the ramp and movable between a downwardly hanging pendant position and an extended position, a vehicle locking device for locking a vehicle against outward movement relative to the dock and including a frame mounted on the forward surface of the dock beneath said dockboard, a locking element mounted on the frame for movement between a locking position in which the locking element is engaged with an abutment on said vehicle to thereby prevent outward movement of the vehicle from the loading dock and a release position, drive means for moving the locking element between the locking position and the release position, means responsive to movement of the lip from the pendant position toward the extended position for operating said drive means to move the locking element from the release position to the locking position and means responsive to downward movement of the lip from the extended position toward the pendant position for operating said drive means to move said locking element from said locking position to the release position.

16. In combination, a dockboard mounted on a loading dock and including a supporting structure, a ramp hinged at its rear edge to the supporting structure and movable between a generally horizontal cross traffic position and an upwardly inclined position, a lip hinged to the forward edge of the ramp and movable between a downwardly hanging pendant position and an extended position, a vehicle locking device for locking a vehicle against outward movement relative to the dock and including a frame mounted on the forward surface of the dock beneath said dockboard, said vehicle locking device including a locking element disposed to move relative to said frame between a locking position in which the locking element is engaged with an abutment on said vehicle to prevent outward movement of said vehicle from a loading dock and a release position, said locking element including an inner section extending outwardly from said frame when said locking element is in the locking position and an outer section extending at an upward angle to said inner section, sensing means projecting upwardly of the upper surface of said inner section and disposed to engage said abutment when said locking element is in the locking position, and signal means operably connected to said sensing means for generating a signal indicating the engagement of the locking element with said abutment on said vehicle.

17. A locking device for locking a movable structure to a fixed structure, comprising a frame mounted on the fixed structure, a slide mounted for vertical sliding movement with respect to the frame, a portion of the slide defining a locking element, a gear member, a rack member, one of said members being connected to said frame and the other of said members being connected to said slide, reversible drive means connected to a first of said members whereby operation of said drive means in one direction will move the slide upwardly in a linear direction to bring said locking element into engagement with an abutment on said movable structure, operation of said drive means in the opposite direction acting to move the slide downwardly relative to the frame to disengage the locking element from said abutment, biasing means interconnecting the second of said members and the frame for urging said second member to a predetermined position, continued operation of said drive means after said locking element engages said abutment causing said second member to move downwardly against the force of the biasing means, and means responsive to downward movement of said second member for stopping operation of said drive means.

18. The device of claim 17, wherein said means responsive to downward movement comprises switch means normally engaged with said second member and operably connected to said drive means, downward movement of said second member causing disengagement of said switch means.

* * * * *

UNITED STATES PATENT AND TRADEMARK OFFICE
CERTIFICATE OF CORRECTION

PATENT NO.   : 4,488,325
DATED        : December 18, 1984
INVENTOR(S)  : DAVID E. BENNETT ET AL It is certified that error appears in the above-identified patent and that said Letters Patent is hereby corrected as shown below:

Col. 8, Line 13, CLAIM 12, Cancel "loding" and substitute therefor ---loading---; Col. 8, Line 19, CLAIM 12, cancel "pendnt" and substitute therefor ---pendant---.

Signed and Sealed this

Seventh Day of May 1985

[SEAL]

Attest:

DONALD J. QUIGG

Attesting Officer — Acting Commissioner of Patents and Trademarks